No. 660,082. Patented Oct. 16, 1900.
T. PROULX.
TRUCK GUARD.
(Application filed Dec. 21, 1899.)
(No Model.)
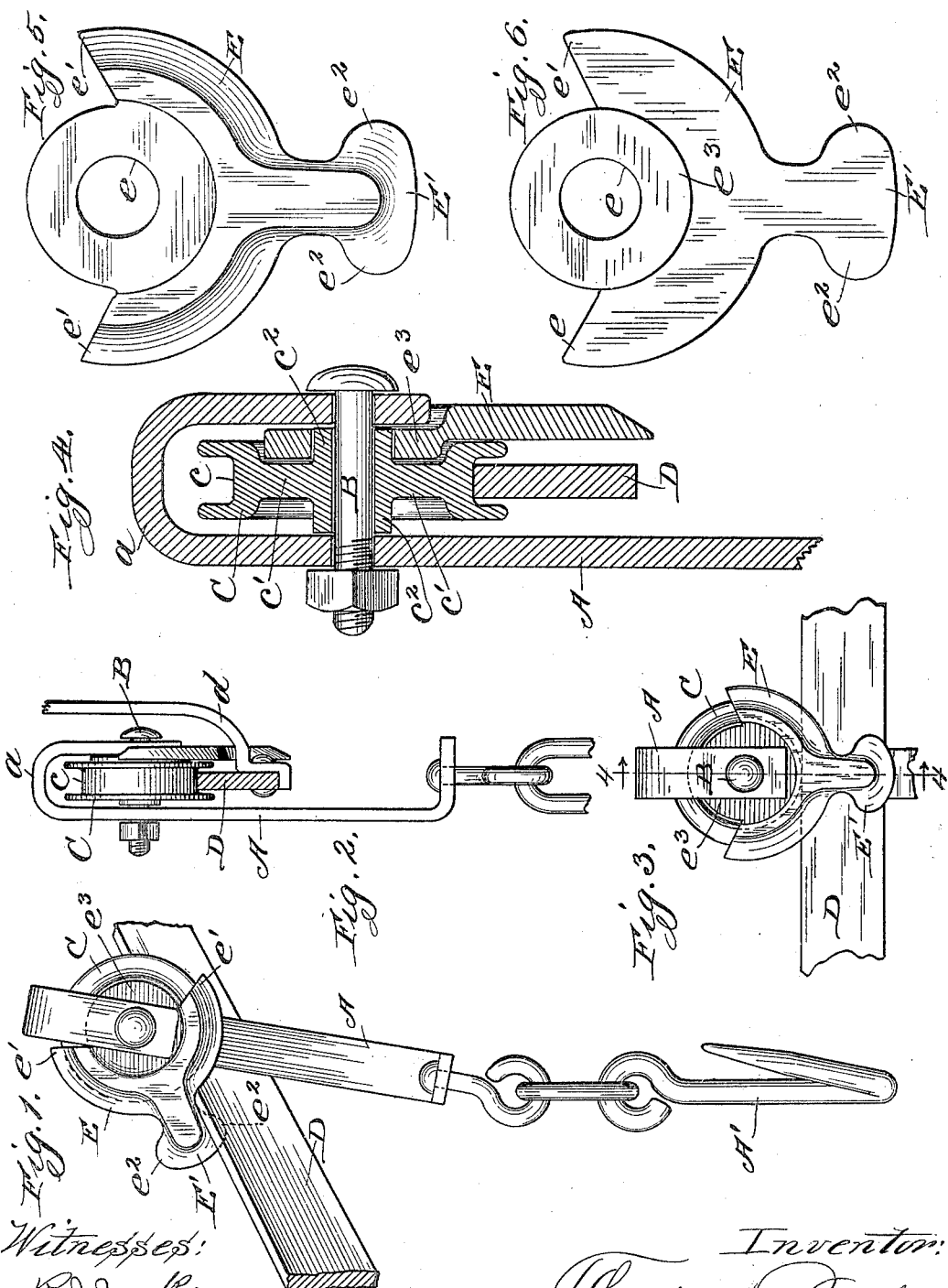

UNITED STATES PATENT OFFICE.

THEODORE PROULX, OF CHICAGO, ILLINOIS.

TRUCK-GUARD.

SPECIFICATION forming part of Letters Patent No. 660,082, dated October 16, 1900.

Application filed December 21, 1899. Serial No. 741,122. (No model.)

*To all whom it may concern:*

Be it known that I, THEODORE PROULX, a citizen of the United States, residing at Chicago, in the county of Cook and State of Illinois, have invented certain new and useful Improvements in Truck-Guards, of which the following is a specification.

This invention relates to improvements in a device to be used in combination with a truck of the type that travels on an elevated rail; and it consists in certain peculiarities of the construction, novel arrangement, and operation of the parts thereof, as will be hereinafter more fully set forth and specifically claimed.

In the large slaughtering establishments or packing-houses the bodies of the animals which have been slaughtered are conveyed from one point to another in the process of dressing, skinning, washing, or otherwise treating the carcasses by means of a truck or grooved wheel which runs on a rail suitably supported in an elevated position. It often occurs that this truck or wheel will jump the rail by reason of some imperfection of the wheel or rail or by reason of the careless handling of the carcass or body of the animal.

To prevent the truck or wheel leaving the track or falling is the principal object of my invention, and in order to enable others skilled in the art to which my invention pertains to make and use the same I will now proceed to describe it, referring to the accompanying drawings, in which—

Figure 1 is a perspective view of a truck embodying my invention, showing the wheel of the truck off the rail and my guard in engagement with the rail and truck, so as to prevent the latter falling, in which operation the position of the truck-frame is reversed. Fig. 2 is a view in elevation of the truck and my guard therefor, showing it mounted on the rail. Fig. 3 is a view in side elevation of a truck with my guard attached thereto and a portion of the rail on which the truck travels. Fig. 4 is an enlarged vertical sectional view through the truck wheel and guard. Fig. 5 is a face view of the guard detached, and Fig. 6 is a rear view thereof.

Similar letters refer to like parts throughout the different views of the drawings.

A represents the truck-frame, which may be made of any suitable size and material, but preferably of metal, and bent back upon itself to form a loop $a$, in the sides of which the axle B of the wheel C has its bearings. The wheel C is formed with a peripheral groove $c$ to receive the rail D, on which it travels. This rail is supported, as usual, by means of chairs or brackets $d$, secured to suitable supports. (Not shown.) The sides of the wheel C are usually provided with annular grooves $c'$, thus leaving its hub $c^2$ somewhat thickened or laterally extended. Located on one side of the wheel C and usually around the hub $c^2$ thereof is my guard or protector, which consists of a piece of metal E, having an opening $e$ to receive the hub or axle B of the wheel C, either of which may be used, as will be presently explained. The upper portion of the piece E is cut away, so as to form shoulders $e'$ on each side of the opening $e$, and the lower portion of the piece or guard E is provided with an enlarged extension E', having lateral projections $e^2$, for the purpose presently to be explained. The guard or piece E is preferably formed with an annular enlargement $e^3$ to fit in the groove $c'$ on one side of the truck-wheel, as is clearly shown in Fig. 4 of the drawings; but if the wheel is formed without said grooves it is apparent that the protector or guard E will not require the said enlargement, or, in other words, it may be made with flat surfaces and mounted on the axle or shaft of the truck-wheel instead of on the hub thereof, as is shown in Fig. 4 of the drawings.

In operation the truck-frame A, which may be provided with a hook A', swiveled in its lower portion, is placed on the rail D, so that the longer side of the loop $a$ of said frame will be located on the opposite side of the rail D from that on which the chairs or brackets $d$ are placed.

The guard E is mounted on the shaft or axle of the truck-wheel, so that it (the said guard) will be adjacent to the chairs or brackets $d$, as is clearly shown in Fig. 2 of the drawings.

The lower portion of the guard being heavier than its upper part, it is apparent that it will normally be kept in the position shown in Fig. 3 of the drawings—that is, with its extension E' downward. As the truck travels on the rail D it is apparent that the hooks or projections $e^2$ of the extension E' of the guard or protector will strike the chairs or brackets $d$, but, being rounded, will pass thereover without any material hindrance, thus affording an extension or guard on the opposite side of the rail from the longer portion of the truck-frame to prevent the wheel leaving the rail or track. Should the wheel be thrown from the track by any cause, it is evident, by reference to Fig. 1 of the drawings, that it cannot fall when provided with my guard, for the reason that the extension E' of the guard, having the projections $e^2$, will engage the rail, as shown in Fig. 1, while one of the shoulders $e'$ will engage the side or edge of the shorter portion of the loop of the truck-frame.

Having thus fully described my invention, what I claim as new, and desire to secure by Letters Patent, is—

1. A truck-guard comprising a piece having an opening in its upper portion and shoulders on each side of said opening, and a downward extension provided with projections, substantially as described.

2. The combination with a truck-frame, of a wheel journaled thereon and having an annular recess on one of its sides, and a guard or protector movably mounted around the axle of the wheel and having an enlargement to fit in said recess, and shoulders in its upper portion, and a downward extension provided with projections, substantially as described.

THEODORE PROULX.

Witnesses:
CHAS. C. TILLMAN,
A. GUSTAFSON.